C. A. WIGGINS.
WATER SOFTENING AND PURIFYING SYSTEM.
APPLICATION FILED NOV. 20, 1916.
1,318,122.
Patented Oct. 7, 1919.
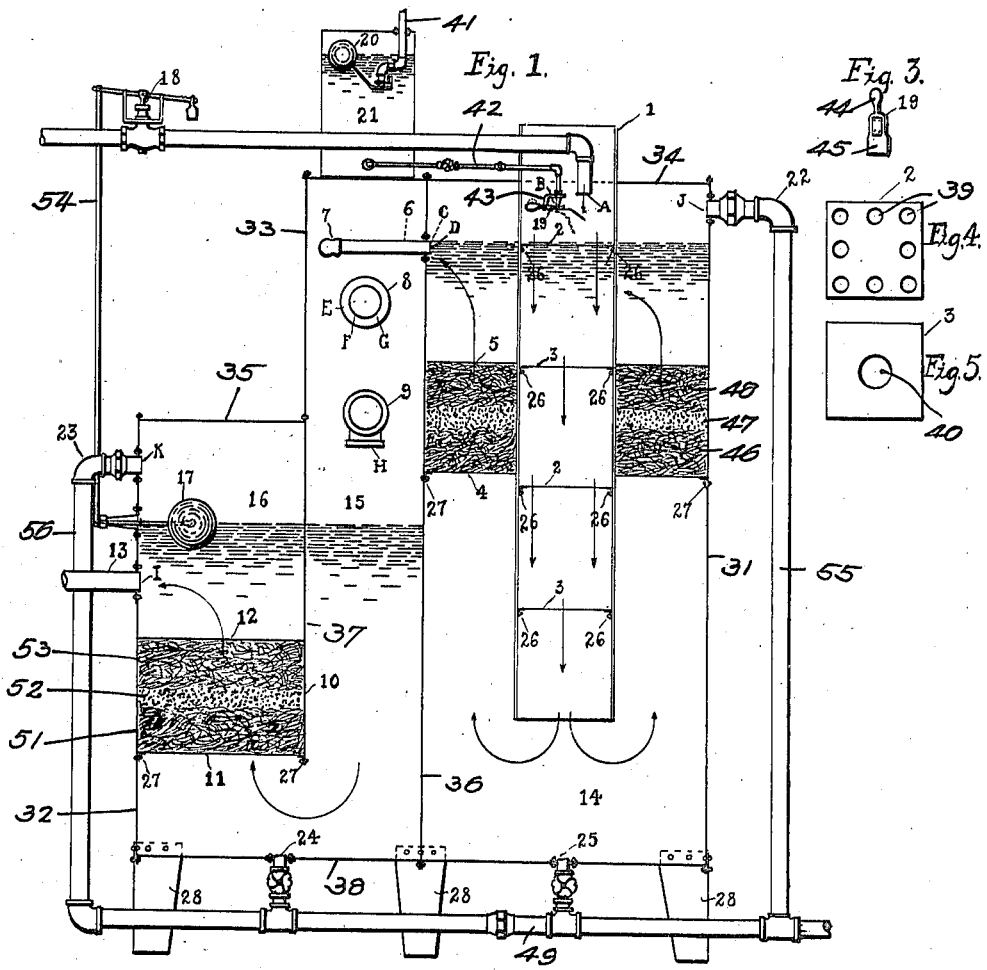
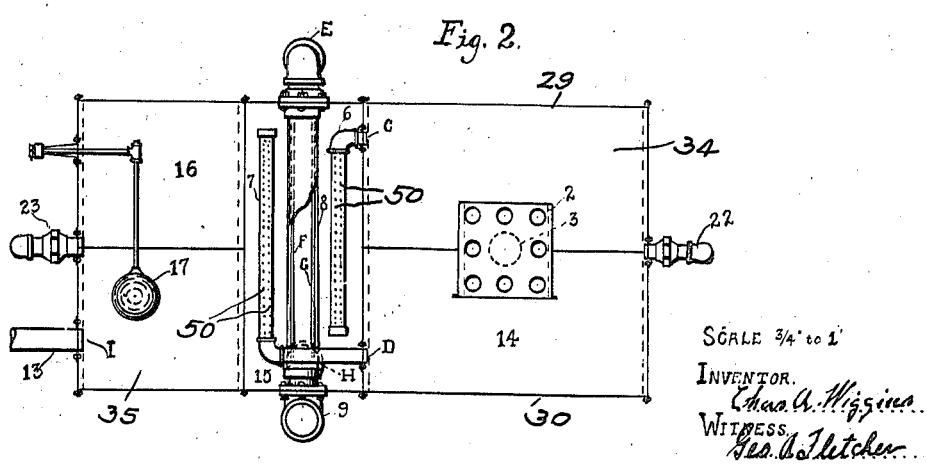
SCALE ¾" to 1'
INVENTOR.
Chas. A. Wiggins
WITNESS.
Geo. A. Fletcher

UNITED STATES PATENT OFFICE.

CHARLES A. WIGGINS, OF KANSAS CITY, KANSAS.

WATER SOFTENING AND PURIFYING SYSTEM.

1,318,122.            Specification of Letters Patent.            Patented Oct. 7, 1919.

Application filed November 20, 1916. Serial No. 132,497.

*To all whom it may concern:*

Be it known that I, CHARLES A. WIGGINS, a citizen of the United States, and resident of Kansas City, in the county of Wyandotte and the State of Kansas, have invented a certain new and useful Improvement in Water Softening and Purifying Systems, of which the following is a specification.

The invention relates to system and apparatus for purifying boiled feed water and seeks to provide a simple and efficient system and apparatus that will remove hard substances and impurities, such as, iron, lime, alkali, sand, soil, and the like, and all substances that will not evaporate, so as to prevent the settling of mud and other foreign matter and the formation of scale on and against the flues, flue sheets and other inner surfaces of the steam generating boiler.

It is well known that the usual water employed for generating steam carries in solution earthy matter as chemicals, soil and the like that cause a coating of the flues and other inner surface of the boiler with mud, scales and like formations and not only shorten the life of the boiler, but insulate the heat from the water resulting in a great loss of fuel, burning of the sheets and flues of the boiler, and often causing destructive boiler explosions. The present invention seeks to provide an improved system and apparatus that will remove the impurities from the water and prevent the formation of scale, incrustation, mud and the like in boilers in which the water is evaporated.

By removing the impurities from the water before it is forced into the steam generating boiler, the life of the boiler and especially the flues is greatly increased, and a great saving in fuel is effected, because the internal surfaces of the boiler are kept clean and the usual heat resisting mud and scale formation is absent, and the liability to explosion is so reduced that it is almost removed.

With these and other objects in view the invention consists in the features of treatment, manipulation, construction, combinations and arrangements of parts hereinafter set forth and more particularly pointed out in the appended claims, the accompanying drawings illustrating the purifying system of treatment and a form of the improved water softening apparatus.

In the drawings:

Figure 1 is a view in elevation of the improved water softening and purifying apparatus with one side of the outer shell and one side of the inner mixing tube removed.

Fig. 2 is a plan view with a part of the cover removed.

Fig. 3 is an inverted plan view of the automatic chemical solution regulating valve.

Fig. 4 is a plan view of one of the alternating chemical solution and water mixing plates, and Fig. 5 is a plan view of the remaining alternating mixing plate.

The outer shell comprises side plates 29 and 30, end plates 31, 32 and 33, cover plates 34 and 35, and division walls 36 and 37, the latter extending to the bottom plate 38 and dividing the shell into two general compartments, it being understood that it is not essential to the invention for these compartments to be connected as shown and there would be no invention in separating them, although they would be more convenient separated for many installations.

The shell is supported by the feet 28 it being obvious that these are not essential as the means of support is not material to the construction or operation.

Between the side walls 29 and 30, bottom plate 38, cover plate 34, end plate 31 and division wall 36 is the compartment 14 in which is located the chemical solution and water mixing tube 1, the tube extending as shown above the cover plate 34, the tube being provided with the perforated mixing plates 2 and 3 alternately located and supported by the angle shaped bars 26, the plates 2 having a series of holes 39 spaced away from the center thereof, while the plate 3 is provided with a single hole 40 approximately in the center thereof so that the feed water and chemical solution will flow through the outer holes of the plates and through the central hole alternately thus mixing the solution and water by agitation as it flows by gravity to the lower part of the chamber 14.

The water is supplied to the mixing tube 1 through the valve 18 which is automatically regulated as hereinafter described, and through the pipe A.

The chemical solution is supplied from any convenient place by the pipe 41 to the vessel 21 and the supply regulated automatically by the ordinary float 20, the pipe 42 leading from the vessel 21 to the mixing tube 1, and provided with the regulating valve 19 which is pivoted to the arm 43 and provided with the weight 44 to hold the wide end 45 of the valve against the end B of the pipe and prevent the chemical solution from flowing therefrom at all times when water is not admitted through the pipe A. When water is admitted through the pipe A the water falls by gravity on the wide end 45 of the valve and holds the valve open so that the chemical solution will flow through the pipe 42 as long as and whenever the water flows through the pipe A.

Supported in the compartment 14 around the mixing tube 1, by the angle shaped bars 27 secured to the plate 31 and wall 36 is the support 4 of any suitable material, to hold the filtering material 5 of any suitable material but preferably comprising the layer 46 of excelsior, the layer 47 of sawdust and the layer 48 of excelsior.

As the water and chemical solution passes downward through the tube 1 and upward through the compartment 14 to the filtering material 5 the chemicals are thoroughly mixed with the water and considerable of matter is separated from the water and falls on the plate 38 where it can be drained out through the valve 25 to the waste pipe 49 which is shown broken away as it is not essential where the waste water and sediment is discharged.

When the water has passed upward through the filtering material 5 it passes through the pipes 6 and 7 being discharged through the perforations 50 in a fine spray to the compartments 15.

Passing through the compartment 15 and side plates 29 and 30 is the steam pipe 8 it being obvious that as the system and apparatus are employed in connection with steam boilers, there is usually an abundance of exhaust steam in which case the pipe is an exhaust pipe, while if there is no exhaust or waste steam, live steam can be economically employed, the pipe being provided with the slits F and G through which the steam passes and meets the sprayed water from the pipes 6 and 7, the escaping steam mingling with and heating the water and being condensed thereby. This intermingling of the water and steam causes the chemicals of the solution to still further loosen and separate the objectionable chemicals and other earthy matter from the water, the objectionable matter falling by gravity to the bottom of the compartment 15 where they can be drained off through the valve 24 to the waste pipe 49.

The L shaped pipe fitting 9 communicates with the interior of the compartment 15 and is provided to conduct the waste steam therefrom, it being understood that the steam enters through the L shaped pipe fitting E.

From the compartment 15 the water passes upward to the compartment 16 through the filtering material 12 preferably of excelsior 51, sawdust 52 and excelsior 53, supported by the common support 11 which rests on the angle shaped bars 27.

The filtering material 12 removes any objectionable matter loosened by the spray and heat, leaving the matter in the lower part of the chamber 15, the water passing to the chamber 16 which is inclosed by the filtering material 12, the cover plate 35, the side plates 29 and 30, end plate 32 and division wall 37.

From the compartment 16 the water is pumped or otherwise drawn through the pipe 13 the end I of which extends into the chamber and forced into the boiler or steam generator, the latter and the process of forcing the water to the boiler being no part of the invention.

In the chamber 16 is located the float 17 connecting through the rod 54 to the valve 18 and automatically regulating the flow of water through the pipe A to the mixing tube 1.

It is obvious form the foregoing that the apparatus is when once started in operation entirely automatic and self controlled.

The pipes 55 and 56 are merely overflow pipes which connect from the upper part of the respective compartments to the waste pipe 49 and are provided as a precaution and safety, in case of accident or improper handling of the apparatus.

The chemical solution preferably employed comprises five pounds of soda ash dissolved in six gallons of lime water to which is added four gallons of water containing two ounces of caustic soda in solution, making ten gallons in all, this being sufficient to soften and purify ten thousand gallons of water, or one gallon of the solution to one thousand gallons of water.

In treating water we use one gallon of chemical solution to every one thousand gallons of water, which mixes in the mixing tube as it travels downward through the alternating mixing pans. In this manner we take out about 35% of the hard substances in the initial water before it travels up through the filter. In leaving the first compartment the water passes into the two spray pipes which spray the water over and about the steam pipe, thereby heating same to 206 to 212 degrees Fahrenheit; this causes the carbonate and sulfurate to separate from the water and settle to bottom of the tank in the second compartment.

Under ordinary conditions the improved system and apparatus will remove 75 to 90 per cent. of the solid matter and chemicals.

From the foregoing it will be understood that the improved system and apparatus will remove the objectionable matter from water so that it can be evaporated in the steam boiler or generator without causing scale, incrustation or mud, that the life of the boiler will be greatly lengthened, a much higher degree of economy attained in the fuel burned to generate the steam, and that the danger of explosion is so reduced thereby that it is almost removed.

It is obvious that changes can be made in the construction set forth and the chemicals employed without departure from the invention.

What I claim as new, and desire to secure by Letters Patent, is:—

1. In a water softening and purifying system, an initial filtering compartment, a second filtering compartment, an intermediate compartment, means to discharge water and chemical in solution to the lower part of said initial filter, a pipe leading from the upper part of said initial filtering compartment to said intermediate compartment, said pipe arranged to spray the water and chemical in solution into said intermediate compartment, means to introduce steam into said intermediate compartment, a float in said second filtering compartment, a valve controlling the supply of water to said initial filtering compartment, and said valve controlled by said float.

2. In a water softening and purifying system, an initial filtering compartment, a heating compartment, a final filtering compartment, means to supply said initial filtering compartment with water, means to supply said initial filtering compartment with chemical in solution, a filtering material in said initial filtering compartment, means to conduct said water and chemical in solution to one side of said filtering material, a spray pipe communicating with said initial filtering compartment on the opposite side of said filtering material, said spray pipe entering said heating compartment and provided with spray orifices, a steam supply pipe connecting with said heating compartment, a steam discharge pipe connecting with said heating compartment, said heating compartment connecting with said final filtering compartment, and an outlet pipe connecting with said final filtering compartment.

3. In a water softening and purifying system, walls forming an initial filtering compartment, walls forming a heating compartment, walls forming a final filtering compartment, a mixing tube in said initial filtering compartment, a filtering material surrounding said mixing tube and spread across said initial filtering compartment, a water supply pipe arranged to discharge into said mixing tube above said filtering material, a chemical solution pipe arranged to discharge chemical in solution into said mixing tube above said filtering material, said mixing tube discharging into said initial filtering compartment below said filtering material, a spray pipe communicating with said initial filtering compartment above said filtering material and leading into said heating compartment, spray orifices in said spray pipe, a steam supply pipe connecting to said heating compartment, a steam discharge pipe connecting to said heating compartment, a filtering material spread across said final filtering compartment, said heating compartment communicating with said final filtering compartment below the filtering material therein, a pipe connecting to said final filtering compartment above the filtering material therein for the purpose of drawing water from said final filtering compartment, a float in said final filtering compartment above the filtering material therein, a valve in said water supply pipe, and means connecting said float and said valve to automatically admit water to said initial filtering compartment as water is drawn from said final filtering compartment.

4. In a water softening and purifying system, walls forming an initial filtering compartment, walls forming a heating compartment, walls forming a final filtering compartment, a vertically disposed mixing tube in said initial filtering compartment, a filtering material around said mixing tube and across said initial filtering compartment, a water supply pipe arranged to discharge water into the upper end of said mixing tube, a chemical supply pipe arranged to discharge chemical in solution into the upper end of said mixing tube, said mixing tube discharging below said filtering material, means to conduct water and chemical in solution from above said filtering material to said heating compartment, means to conduct steam to and from said heating compartment, a filtering material spread across said final filtering compartment, said heating compartment communicating with said final filtering compartment below the filtering material therein, means to draw water from said final filtering compartment and from above the filtering material therein, a float in said final filtering compartment above the filtering material therein, a valve in said water supply pipe, means connecting said float and said valve whereby water is automatically admitted to said initial filtering compartment as the water is drawn from said final filtering compartment, and means operated by the flow of water from said water supply pipe to said mixing tube whereby chemical in solution is caused to flow into said mixing tube during said flow of the water.

CHAS. A. WIGGINS.